(12) United States Patent
Eichenseer et al.

(10) Patent No.: US 11,787,644 B2
(45) Date of Patent: Oct. 17, 2023

(54) TRANSPORTING INSTALLATION FOR CONTAINERS

(71) Applicant: KRONES AG, Neutraubling (DE)

(72) Inventors: Bernhard Eichenseer, Sinzing (DE); Xaver Karl, Sinzing (DE); Martin Seger, Neumarkt (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/416,442

(22) PCT Filed: Nov. 13, 2019

(86) PCT No.: PCT/EP2019/081119
§ 371 (c)(1),
(2) Date: Jun. 18, 2021

(87) PCT Pub. No.: WO2020/126237
PCT Pub. Date: Jun. 25, 2020

(65) Prior Publication Data
US 2022/0073285 A1 Mar. 10, 2022

(30) Foreign Application Priority Data
Dec. 21, 2018 (DE) ...................... 10 2018 222 776.4

(51) Int. Cl.
*B65G 47/86* (2006.01)
*B65G 33/04* (2006.01)
(Continued)

(52) U.S. Cl.
CPC .......... *B65G 47/842* (2013.01); *B65G 33/04* (2013.01); *B65G 35/02* (2013.01); *B65G 47/847* (2013.01);
(Continued)

(58) Field of Classification Search
None
See application file for complete search history.

(56) References Cited

U.S. PATENT DOCUMENTS 3,590,982 A * 7/1971 Banyas ................. C03B 35/125
198/470.1
3,860,104 A 1/1975 Strauss
(Continued)

FOREIGN PATENT DOCUMENTS

DE 2418980 A1 11/1974
DE 29722245 U1 2/1998
(Continued)

OTHER PUBLICATIONS

ISA European Patent Office, International Search Report Issued in Application No. PCT/EP2019/081119, dated Apr. 17, 2020, WIPO, 6 pages.
(Continued)

*Primary Examiner* — William R Harp
(74) *Attorney, Agent, or Firm* — McCoy Russell LLP (57) ABSTRACT

Transporting installation for containers, such as bottles, having a first transporting device, which can transport containers by neck-handling, and a second transporting device, which can transport containers by base-handling, wherein the first transporting device transports the containers at a different height from the second transporting device, wherein, in a transfer region in which the containers can be transferred from the first transporting device to the second transporting device, the second transporting device runs linearly and a linear guide device is provided, said guide device running parallel to the second transporting device and being adapted such that it can guide a container as the container is being lowered from the first transporting device to the second transporting device.

17 Claims, 4 Drawing Sheets

(51) Int. Cl.
*B65G 35/02* (2006.01)
*B65G 54/02* (2006.01)
(52) U.S. Cl.
CPC ...... *B65G 54/02* (2013.01); *B65G 2201/0247* (2013.01)

(56) References Cited

U.S. PATENT DOCUMENTS

| | | |
|---|---|---|
| 4,655,338 A | 4/1987 | Hershey et al. |
| 6,308,817 B1 | 10/2001 | Corniani et al. |
| 2008/0060912 A1 | 3/2008 | Marti Mercade et al. |
| 2011/0259709 A1 | 10/2011 | Grossman |

FOREIGN PATENT DOCUMENTS

| | | |
|---|---|---|
| DE | 102004048515 A1 | 4/2006 |
| DE | 102013112091 A1 | 5/2015 |
| FR | 1341489 A | 11/1963 |
| JP | H11322066 A | 11/1999 |
| WO | 9802371 A1 | 1/1998 |
| WO | 2010088942 A1 | 8/2010 |

OTHER PUBLICATIONS

China National Intellectual Property Administration, Office Action and Search Report Issued in Application No. 201980092500.3, dated Jun. 21, 2022, 26 pages. (Submitted with Partial Translation).
China National Intellectual Property Administration, Office Action and Search Report Issued in Application No. 201980092500.3, dated Feb. 8, 2023, 25 pages.

* cited by examiner

TRANSPORTING INSTALLATION FOR CONTAINERS

CROSS REFERENCE TO RELATED APPLICATIONS

The present application is a U.S. National Phase of International Application No. PCT/EP2019/081119 entitled "TRANSPORTING INSTALLATION FOR CONTAINERS," and filed on Nov. 13, 2019. International Application No. PCT/EP2019/081119 claims priority to German Patent Application No. 10 2018 222 776.4 filed on Dec. 21, 2018.

TECHNICAL FIELD

The present invention relates to a transporting installation for containers, such as bottles, and a method for transferring containers from a first transporting device to a second transporting device in a transfer region.

BACKGROUND AND SUMMARY

Transporting installations are well known in the field of container production and processing. For both returnable and non-returnable PET bottles, such transporting installations consist of the following individual container handling machines, which are then often operated as a complete block machine. The preforms are heated in a heating infeed and then formed into containers in a stretch blow molder. After this, the containers can be provided with a label in a labeling machine. Afterwards, the containers are filled with a product by a filling machine and then sealed by a sealing machine. It is also conceivable that the containers are filled immediately after the stretch blow molder and then sealed and labeled by the machines described above. There are various concepts for transporting containers, which also include different ways of handling the containers for transport.

On the one hand, it is known to transport containers using the so-called "neck-handling" method, in which the containers are clamped by their normally provided support ring or gripped in some other suitable way at the head area and transported "hanging" through a transporting device and/or container handling machine. This offers the advantage that the remaining container volume (in particular the base area of the container) is accessible and can be viewed, for example, as part of an inspection of the container. An alternative to this is the transport of the containers in the so-called "base-handling" method, in which the containers are either transported upright on a conveyor belt or are gripped at least in the lower area (base area) of the container.

The transfer of the containers from neck-handling to base-handling is particularly problematic here. For a given container size, this is usually possible by transferring the containers to a chute, for example, along which they slide onto the transporting device aligned to base-handling. However, this becomes difficult when the entire container handling installation is intended to handle containers of different sizes.

In this context, concepts have already been developed in which this transfer takes place with the aid of rotating starwheels. However, during transfer by rotating starwheels, high centrifugal forces occur due to the rotational speeds of the containers along their transport at high container throughputs so that lowering the containers onto the transporting device for base-handling may still be possible for some container sizes, but can no longer be realized for other container sizes due to the centrifugal forces that occur.

Problem

Based on the known state of the art, the technical problem to be solved is thus to provide a transporting installation for containers such as bottles, with which a reliable transfer of the containers from neck-handling to base-handling can be ensured, even for container formats of different sizes, while at the same time a high container throughput is realized.

Solution

According to the invention, this problem is solved by the transporting installation for containers and the method for transferring containers from a first transporting device to a second transporting device in a transfer region, as described herein.

The transporting installation for containers, such as bottles, according to the invention comprises a first transporting device, which can transport containers by neck-handling, and a second transporting device, which can transport containers by base-handling, wherein the first transporting device transports the containers at a height different from the second transporting device, wherein in a transfer region, in which the containers can be transferred from the first transporting device to the second transporting device, the second transporting device extends linearly, and a linear guide device is provided which extends parallel to the second transporting device and is adapted to guide a container during a lowering from the first transporting device to the second transporting device.

The containers can be all common containers, not only bottles, but also cans or the like. The containers, especially bottles, can be made of or comprise PET. Other materials are also conceivable, such as glass. They can also be disposable or reusable bottles (or containers in general).

It goes without saying that the transport of the containers by neck-handling by means of the first transporting device takes place at a greater height than the transport of the containers by base-handling in the second transporting device. The first transporting device and the second transporting device must be arranged relative to each other only such that a transfer of the containers from the first transporting device to the second transporting device is possible by lowering the containers in the transfer region. Otherwise, the relative position of the first transporting device and the second transporting device to each other is not relevant.

A "linear" transporting device is basically understood to be a transporting device (preferably running in the horizontal plane) that runs straight or in a straight line, thus, having no curvature. However, in some embodiments it may also be provided that the transporting device is only "essentially" linear, thus, having a certain deviation from a straight line. Measured against the total length of the transporting device, this deviation can be 5% to 15%, for example, which corresponds to a curvature of up to approximately 3° or up to approximately 7°.

In addition, the term of a linear transporting device can also include transporting devices that, for example, have an incline or decline, i.e. do not run horizontally.

All the embodiments exemplarily mentioned, thus, the linear and the "essentially" linear transporting device with the described curvature and/or with an incline and/or with a slope are to be understood under the term "linear" transporting device.

Moreover, the transport direction of the exemplary second transporting device may be different from the transport direction of the exemplary first transporting device. In other words, for example, the transport direction of the second transporting device may be parallel or non-parallel to the transport direction of the exemplary first transporting device, i.e., the transport directions of the two transporting devices may be at a non-zero angle to each other and/or may lie in different spatial planes.

The same applies to the linear guide device.

In one embodiment, the transporting installation according to the invention can transport PET returnable or also non-returnable bottles through successive individual container handling machines, which are then often operated as a complete block machine. The preforms are transported, for example, by neck-handling and heated in a heating infeed before being formed into the containers in a stretch blow molder. Subsequently, the containers, which can still be transported to a labeling machine by neck-handling, can be labeled in a labeling machine by base-handling. The containers are then transported by neck-handling from the labeling machine to a filling machine, where they are filled with a product and then transferred by base-handling and sealed with a sealing machine.

It would also be conceivable that the containers are filled immediately after the stretch blow molder and then sealed and labeled by the machines described above.

The above embodiments are not to be regarded as fundamentally restricting the invention. Other machines in which or between which the transporting installation according to the invention transports containers are also conceivable.

In one embodiment, it is provided that the transporting installation for containers, such as PET returnable or non-returnable bottles, ends with the filling machine, which is a first transporting device, in which the containers are transported by neck-handling and are transferred to a second transporting device, which can transport containers by base-handling, such as a conveyor belt, wherein in a transfer region in which the containers can be transferred from the first transporting device to the second transporting device, the second transporting device runs linearly and a linear guide device is provided which runs parallel to the second transporting device and is adapted to guide a container during a lowering from the first transporting device to the second transporting device.

Another embodiment provides that the transporting installation for containers, such as PET returnable or non-returnable bottles, ends with the sealing machine, which is a first transporting device, in which the containers are transported by neck-handling and are transferred to a second transporting device, which can transport containers by base-handling, such as a conveyor belt, wherein in a transfer region in which the containers can be transferred from the first transporting device to the second transporting device, the second transporting device runs linearly and a linear guide device is provided which runs parallel to the second transporting device and is adapted to guide a container during a lowering from the first transporting device to the second transporting device.

The guiding of the container during the lowering is to be understood as a contacting contact with the container, by which at least a falling over in the direction of the transport of the containers in the second transporting device is prevented. The guiding of the container thus compensates at least for the torque acting in the direction of transport of the containers in the second transporting device, which may act on the container when it is transferred from the first transporting device to the second transporting device by lowering.

It can be provided that in the area of the second transporting device, and in particular in the transfer region, a conveyor channel is always formed on both sides, which ensures lateral guidance of the containers. Depending on the embodiment, this can also be done in combination with an (additional) guide rail.

By means of this transporting installation, it can be ensured that containers of different sizes can also be transferred from the first transporting device to the second transporting device without falling over, while at the same time achieving a high container throughput.

In one embodiment, it is provided that the first transporting device and the second transporting device have, at least in the transfer region, a distance perpendicular to the transport plane of the containers that is greater than or at most equal to a length of a container that can be transported by the first and the second transporting device.

In this case, the lowering thus comprises a "falling down" from the first transporting device onto the second transporting device during the transfer. Here, it can be provided that the guide device not only prevents the containers from tipping over in the direction of the transport direction in the second transporting device, but at the same time or additionally realizes a delayed lowering of the container compared to the free fall. This means that the transporting installation can be used for containers of the most varied sizes.

Furthermore, the second transporting device can have a transfer plane in the transfer region which is inclined downwards in the transport direction of the containers.

With this transfer plane, containers of different sizes can be reliably transferred from the first transporting device to the second transporting device and finally come to a stop on the second transport direction.

The transfer plane can be adjustable in height.

The transfer plane can also be configured as an exchangeable part which, depending on the container size, takes into account the difference in height and has to be exchanged accordingly.

Different deceleration curves are also conceivable. For example, a curve with an initial area with a low incline, followed by a linear middle section and subsequent declining end curve is conceivable.

Moreover, the transfer plane can preferably be configured as a traveling conveyor belt. In this way, speed differences between the containers and the outfeed are avoided as far as possible during depositing.

The transfer plane can thus be adapted to different container sizes.

Furthermore, the guide device can comprise at least one guiding screw arranged between the first transporting device and the second transporting device and on one side of the second transporting device in the transfer region for guiding the containers.

The guiding screw is preferably arranged such that its axis of rotation runs parallel to the transport direction of the containers at least in the transfer region along the second transporting device. By rotating the guiding screw, the containers can be guided in the transfer region in the direction of the transport direction of the containers in the second transporting device and the speed that can be set with the guiding screw can also prevent the containers from tipping over.

In a further development of this embodiment, the guide device comprises a second guiding screw for guiding the containers, wherein the second guiding screw is arranged on the same side of the second transporting device and at a distance from the second transporting device that is different from the distance of the first guiding screw from the second transporting device, or wherein the second guiding screw is arranged on the opposite side of the second transporting device.

If the guiding screws are both provided on the same side, guiding during lowering can also be performed reliably for containers of different sizes throughout the entire lowering process. If the guiding screws are arranged on both sides of the second transporting device in the transfer region, not only can tipping over in the direction of the transport direction of the containers in the second transporting device be avoided, but at the same time tipping over laterally out of the second transporting device can also be avoided.

The guiding screws can also be used to reduce the distance between containers. For this purpose, the guiding screws are configured with an initial incline that is compatible with the first transporting device. An incline is the distance between the containers, i.e. measured from the start of a first container to the start of the next container (=container diameter plus gap). In the further course of these guiding screws, this distance is then continuously reduced. This results in a reduced transfer speed at the outlet of the guiding screws compared with the inlet.

Furthermore, it may be provided that the guide device comprises at least one clamping device arranged between the first transporting device and the second transporting device and movable in the transport direction of the containers, which can guide a container by clamping around it during lowering from the first transporting device to the second transporting device.

The clamping device can, for example, grasp and contact the container below the support ring, so that when the container is lowered, the container is preferably lowered through the clamping device.

It can further be provided that the second transporting device comprises a horizontal transport plane in the transfer region and the guide device comprises at least one receptacle which is movable in the transport direction of the containers in the second transporting device and with which a container can be picked up from the first transporting device and transferred to the second transporting device, the receptacle being configured to lower the container from the first transporting device onto the second transporting device.

The movable receptacle is understood to be such a receptacle that can pick up the container such that the lowering of the container in the transfer region is determined solely by the movement or lowering of the receptacle. The container therefore preferably does not slide through the receptacle, but is actively lowered by it in the transfer region until it rests on the second transporting device. An inclined plane for sliding down the container depending on its size is thus no longer necessary. At the same time, the containers can be lowered in a controlled and flexible manner.

The guide device can comprise a long stator and the receptacle can be provided as a shuttle movable along the long stator with a pick-up region for a container.

The use of electric drives by means of long stators and the like, allows very flexible control of the movement of individual receptacles, even independently of each other.

The electric drives can also be used to reduce the distance between the containers. For this purpose, the electric drives are synchronized with an initial speed suitable for the first transporting device and, in the further course of the long stator, the speed of the electric drives is continuously reduced to a minimum distance between the containers. This results in a reduced transfer speed at the outlet of the second transporting device compared to the inlet.

According to the method according to the invention for transferring containers from a first transporting device to a second transporting device in a transfer region, it is provided that the first transporting device and the second transporting device transport the containers at different heights from one another, and the first transporting device transports the containers by neck-handling and the second transporting device transports the containers by base-handling, wherein the containers are transported linearly in the second transporting device and a linear guide device is provided which runs parallel to the second transporting device and guides a container during a lowering from the first transporting device to the second transporting device.

This method allows reliable lowering of containers from neck-handling to base-handling at high throughput.

Furthermore, at least in the transfer region, the first transporting device and the second transporting device can have a distance perpendicular to the transport plane of the containers that is greater than or at most equal to a length of a container that is transported by the first and the second transporting device.

With this embodiment, containers of various sizes can ultimately be lowered onto the second transporting device in the transfer region without unintentional contact with the first transporting device.

In one embodiment, the second transporting device has a transfer plane in the transfer area which is inclined downwards in the transport direction of the containers, wherein the transfer plane is height-adjustable and its height is set depending on the length of the container.

The transfer plane can assist in lowering the container onto the second transporting device by ensuring permanent contact with the base of the container so that it is protected against tipping over.

In a further development of this embodiment, it is provided that the guide device comprises at least one guiding screw arranged between the first transporting device and the second transporting device and on one side of the second transporting device in the transfer region, which guides the container during lowering from the first transporting device onto the second transporting device.

With suitable control of its rotational speed, the guiding screw can reduce the torque acting on the container at least in the direction of the transport direction of the containers in the second transporting device in the transfer region and prevent it from tipping over.

The guide device may comprise at least one clamping device arranged between the first transporting device and the second transporting device and movable in the transport direction of the containers, which guides a container by clamping it during lowering from the first transporting device to the second transporting device.

By clamping the container during lowering, it is effectively prevented from falling over in any conceivable direction.

In one embodiment, the second transporting device has a horizontal transport plane in the transfer region, and the guide device comprises at least one receptacle which is movable in the transport direction of the containers in the second transporting device and by means of which a container is picked up from the first transporting device and transferred to the second transporting device, wherein the receptacle lowers the container from the first transporting device onto the second transporting device in the transfer region.

This allows reliable and at the same time very flexible lowering of the containers onto the second transporting device.

DETAILED DESCRIPTION

Figure 1:
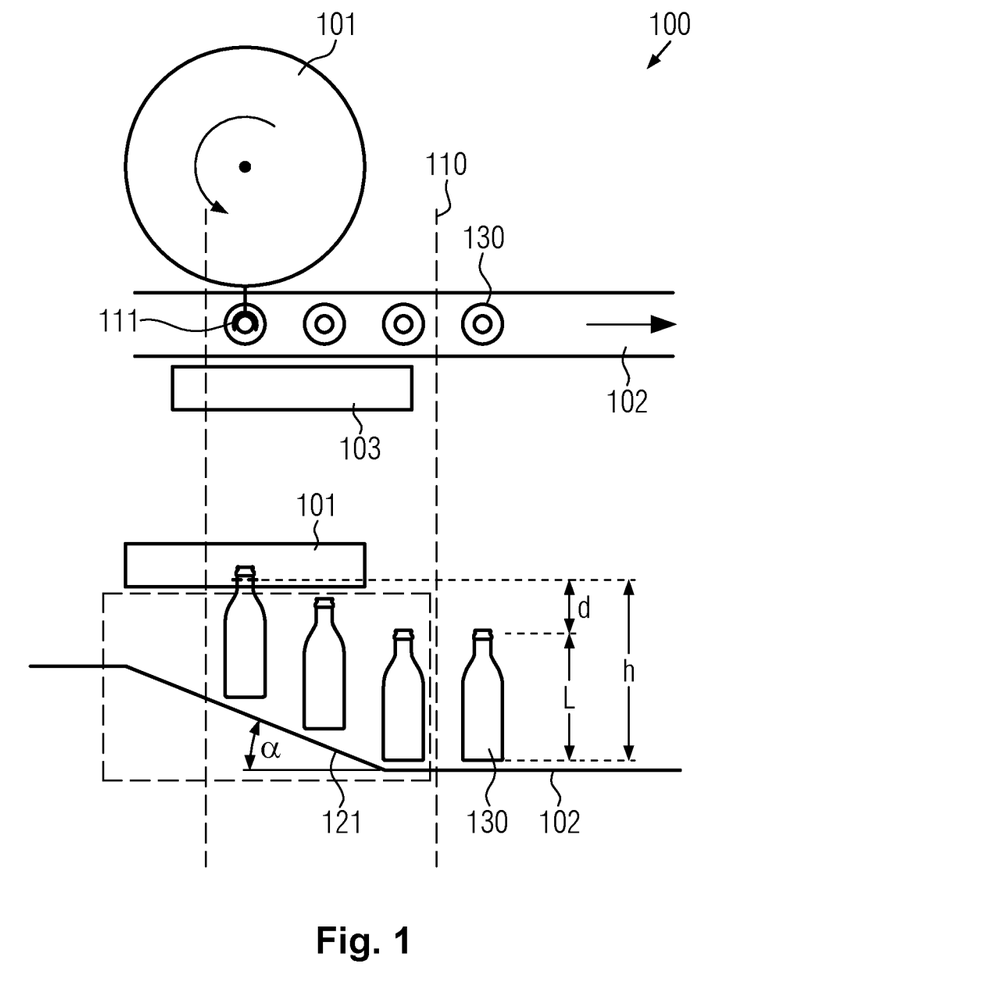
FIG. 1 schematic view of a transporting installation according to the invention

FIG. 1 shows a transporting installation 100 according to an embodiment of the invention in thematic side view and in top view. On the one hand, a first transporting device 101 can be seen, which transports the containers by neck-handling. The first transporting device 101 can, for example, be configured as a starwheel with a series of grippers 111, which either grasp the support ring itself or grip the container below its support ring so that the support ring rests on the grippers. Other variants are also conceivable here, for example that the entire head area of the container is grasped by the grippers 111.

The embodiment of the first transporting device as a starwheel is not mandatory. It can also be configured as a linear machine for transporting the containers by neck-handling. Alternatively, it can also be provided that the first transporting device is a container handling machine, which is realized, for example, as a carousel (analogous to the starwheel) or as a linear machine. At the same time, these containers are transported in the corresponding container handling machine so that the container handling machine also fulfills the purpose of a first transporting device.

As can be seen in the side view, the containers are transported at a height h by the first transporting device.

Furthermore, the transporting installation 100 comprises a second transporting device 102, which is configured as a linear transporting device and as a transporting device for transporting the containers using the base-handling method. Base-handling means that the containers are either transported on a conveyor belt and/or are in contact with the second transporting device at least in the area of their base for transport by the second transporting device. This also includes, for example, implementations in which clamps or receptacles are provided that engage on the base of the container 130, however, not on its support ring.

During transport of the containers 130 by the second transporting device, there is therefore no grasping of the container in the area of the support ring.

Framed in dashed lines in FIG. 1 is a transfer region 110 in which the containers are transferred from the first transporting device 101 to the second transporting device 102. The second transporting device is obviously located below the first transporting device so that the containers must be lowered in order to be transported further by the second transporting device.

For this purpose, as shown here, a transfer plane 121 that is downwardly sloped or downwardly inclined in the transport direction can be arranged in the transfer region 110, which can come into contact with the base of the container while it is being lowered from the first transporting device onto the second transporting device. The transfer plane can be considered as part of the second transporting device.

In order to prevent the container from falling over in the transport direction during lowering, according to the invention a linear guide device is provided at least in the transfer region, which preferably runs parallel to the second transporting device and is configured such that it can guide the containers during lowering from the first transporting device onto the second transporting device and can thus at least prevent the containers from falling over in the direction of the transport direction in the second transporting device 102. The guide device 103 is shown only schematically in FIG. 1, but will be described in more detail below.

As can be seen from FIG. 1, the distance between the second transporting device 102 and the first transporting device 101 is the height h. Preferably, this height is at least equal to, but possibly greater than, any of the containers to be transported by the transporting device. The containers have a length l so that preferably h>l. This results in the fact that the containers must be lowered the distance d=h−l when they are lowered from the first transporting device to the second transporting device.

Since the height at which the containers are grasped during transport in the first transporting device by neck-handling is always the same, the position of the base changes depending on the length l of the container.

It can therefore be provided that the downwardly inclined transfer plane can be adjusted in height, in particular that the angle of inclination a can be adjusted. This allows the transfer plane to be inclined so that it always contacts the base of the container during lowering and can thus control the lowering of the container onto the second transporting device. If the transfer region has a length b in the horizontal direction and the transfer plane extends over the entire length b, then the following can be assumed for =h−l/b. A container to be transferred will then contact the transfer plane with its base at any time during the transfer and then the second transporting device with its base.

Figure 2A:
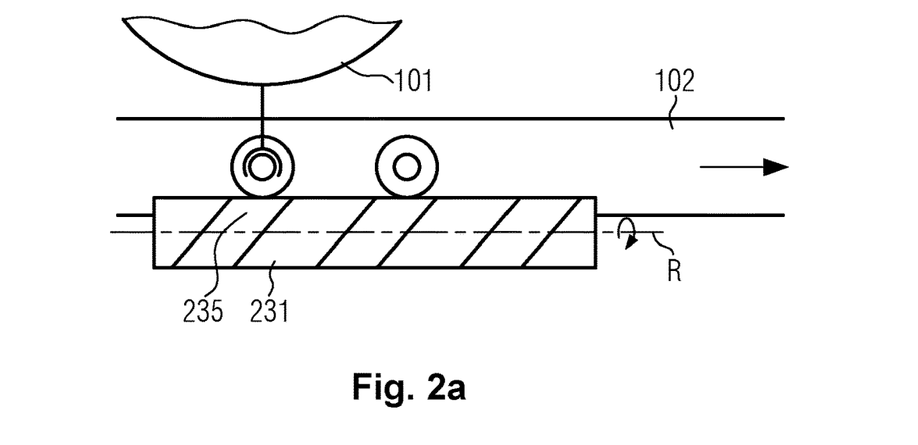
FIGS. 2a-2c schematic views of a transporting installation with guiding screws
Figure 2B:
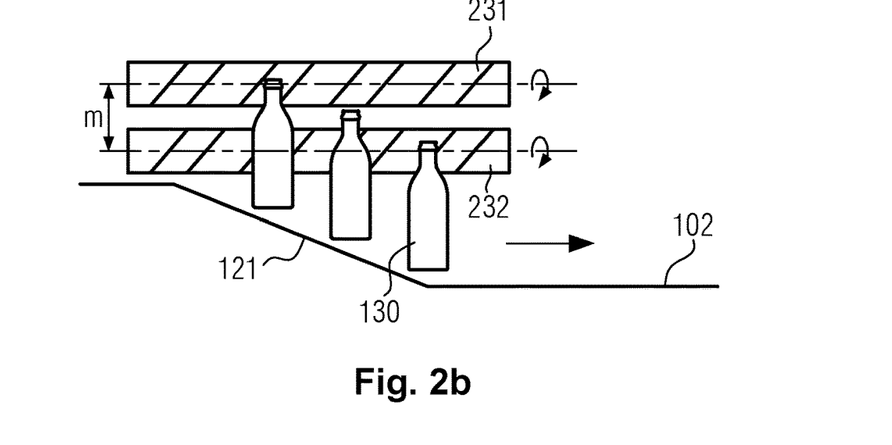
Figure 2C:
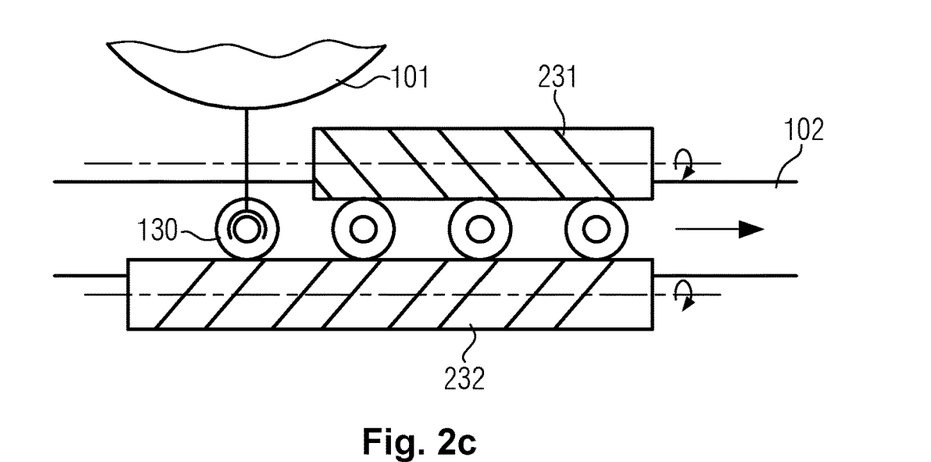

FIGS. 2a to 2c show a first possible embodiment of the guide device of FIG. 1. In this embodiment, the guide device 231 is formed by a guiding screw rotatable about a rotation axis R parallel to the transport direction of the containers in the second transporting device 102. Preferably, the guiding screw has a series of recesses 235 that can contact and partially pick up the containers. By adjusting the rotational speed of the guiding screw, the lowering and/or at least the propulsion of the containers can be controlled during lowering by the guiding screw. The containers are thus effectively prevented from falling over in the direction of the transport direction of the containers in the second transporting direction.

FIG. 2b shows a side view of the embodiment described in FIG. 2a. As can be seen here, two guiding screws 231 and 232 can also be arranged on the same side of the second transporting device 102. This embodiment is particularly advantageous when the height difference to be bridged by the containers is comparatively large. By using at least two guiding screws (there can also be more than two guiding screws), it is then possible to guide the containers during the entire lowering process from the first transporting device to the second transporting device, for example along the downwardly inclined transfer plane 121.

As shown in FIG. 2b, the guiding screws 231 and 232 can be arranged spaced apart from each other so that their axes of rotation have the distance m. It can be provided that the guiding screws are adjustable with respect to their distance. For example, the guiding screws may be arranged in a support structure having rails along which the guiding screws may preferably be moved independently of each other perpendicularly (vertically) to the second transporting device 102 in order to adjust their distance m from each other. This ensures that even short containers (of comparatively short length) are always guided by at least one guiding screw. This embodiment is also applicable to an embodiment in which more than two guiding screws are provided and can also be used when only one guiding screw is used in order to adjust the position of the one or more guiding screws such that permanent guiding of containers of any length by at least one guiding screw can be ensured.

FIG. 2c shows a further embodiment in which again at least two guiding screws are used. In this embodiment, however, at least one guiding screw is arranged on each side of the second transporting device in the transfer region. The direction of rotation of the guiding screws can be opposite or the direction of the circumferentially arranged recessed surfaces can be opposite and the direction of rotation can be the same so that, when the guiding screws are rotated, the containers are guided in the transfer area in the same direction (in the transport direction of the containers in the second transporting device) on both sides.

This embodiment offers the advantage of preventing the container from falling over not only in the direction of transport of the containers in the second transporting device, but also in a direction perpendicular thereto in the plane shown here.

Analogous to the description in FIG. 2b, more than one guiding screw, for example two, three or more, can be arranged on each side of the second transporting device, which are also arranged analogously to FIG. 2b at a possibly adjustable distance from one another.

Figure 3:
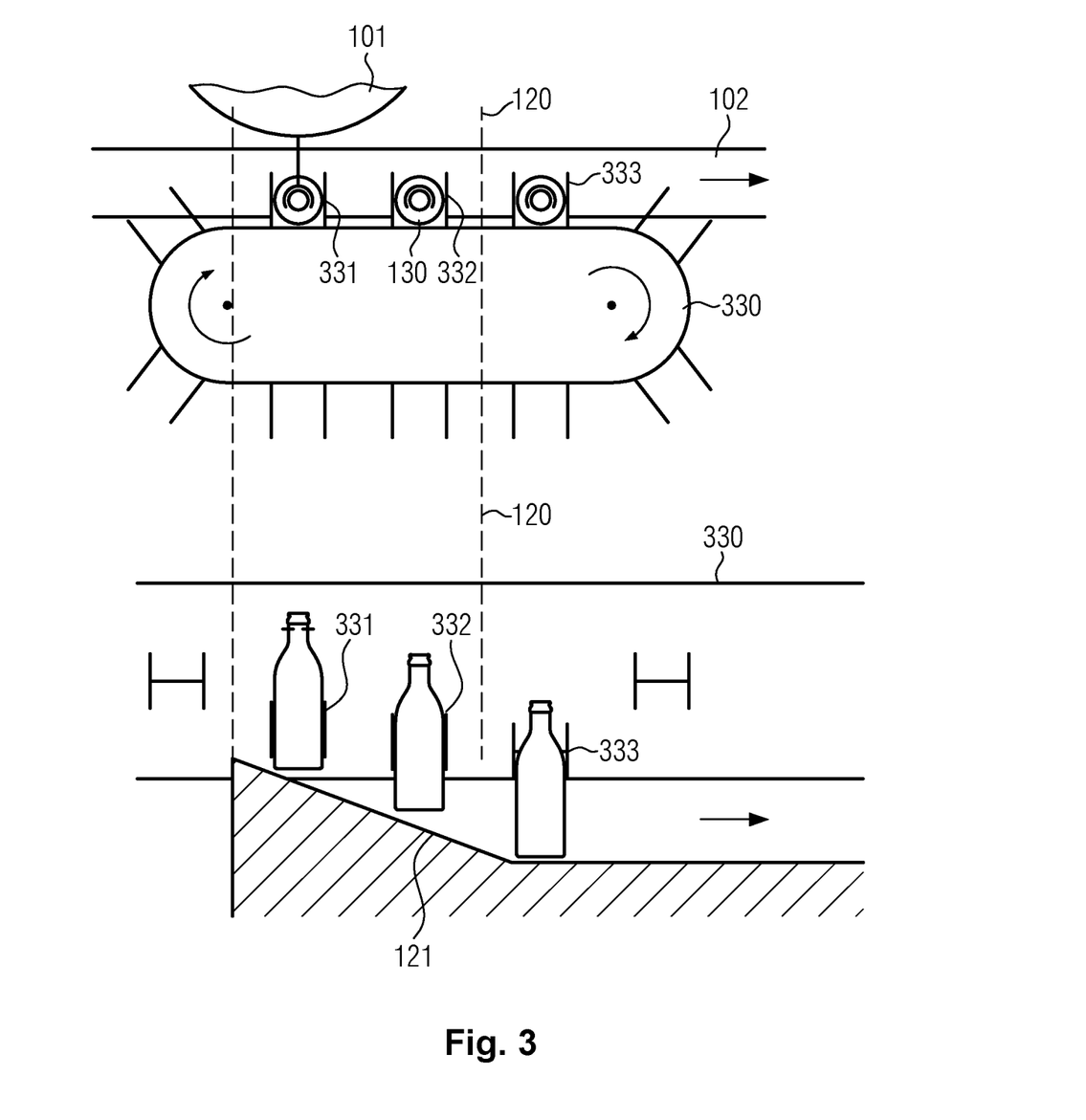
FIG. 3 schematic view of a transporting installation with clamping device as guide device FIG. 4 schematic view of an embodiment of the transporting installation with receptacles according to an embodiment

FIG. 3 shows a further embodiment in which the guide device 330 comprises a series of clamping devices 331 to 333 which, for example, revolve along a chain and run parallel to the second transporting device 102 at least in the transfer region 120. In this embodiment, the clamping devices can grasp around a container from at least two sides, wherein said grasping takes place such that the container is still displaced vertically with respect to the clamping devices at least due to the force of gravity acting on it in the transfer region 120 and is thus lowered. The clamping devices can then be carried along with the container in the transport direction in the second transporting device 102 and guide the lowering of the container.

Furthermore, even if they do not firmly grasp the container, they can realize a delay of the lowering if, for example, no inclined transfer plane 121 should be provided in the transfer region 120. This delay in lowering can be effected, for example, by the clamping devices having a friction surface with a high coefficient of friction on the side facing the container so that the container is prevented from lowering. In this context, it can be advantageously provided that the friction surface has a soft outer surface which is softer than the surface of the container in order to prevent scratching of the surface of the container during lowering.

Preferably, the opening width of the clamping devices is adjustable so that they can also grasp containers of different widths that are to be transported in the first and second transporting devices.

Instead of a clamping device, a conventional compartment chain is also conceivable. This involves a revolving lateral belt drive to which vertical webs are attached at equidistant intervals. These thus form a container receptacle in the form of a pocket in which the containers can slide downwards guided by the lowering chute running underneath.

Figure 4:
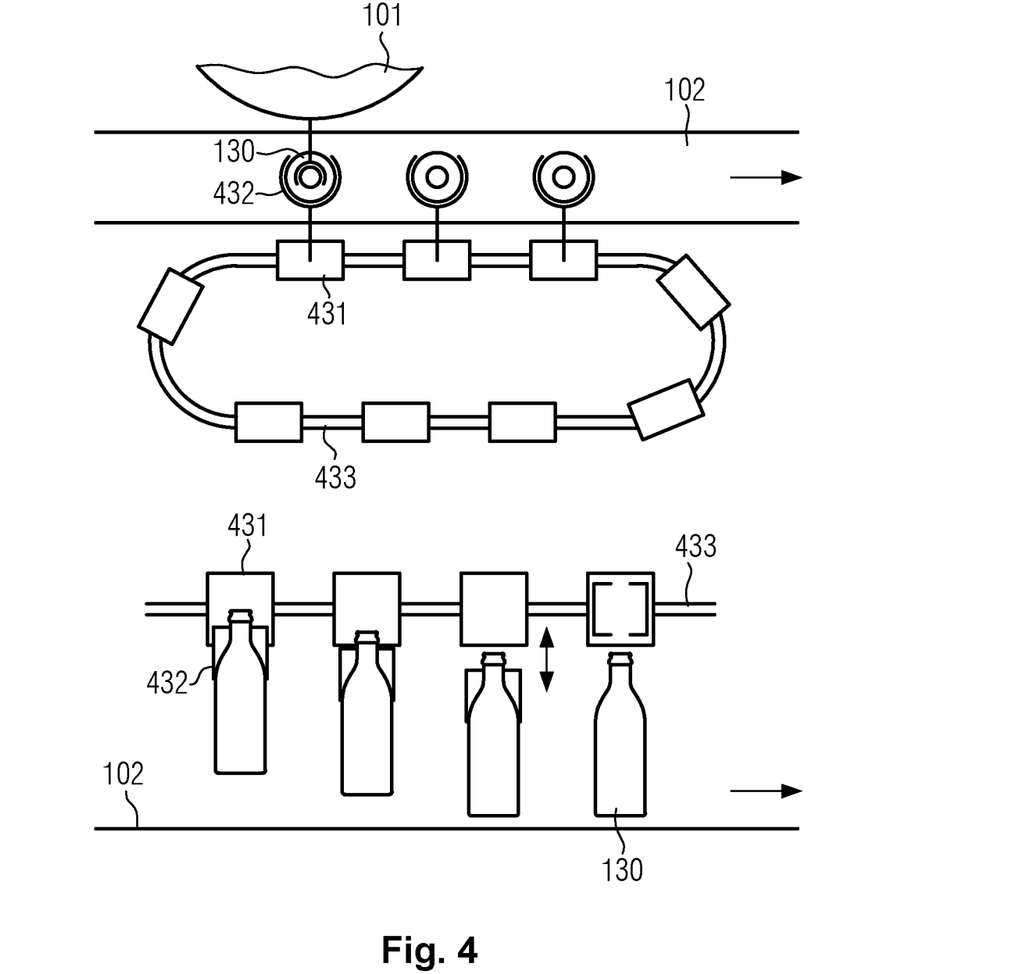

FIG. 4 shows a further embodiment of the guide device 103 of FIG. 1. In this embodiment, it is provided that the guide device is formed by a series of shuttles 431, which preferably revolve along a long stator 433. The shuttles 431 each comprise at least one preferably movable receptacle for a container, wherein the receptacle 432 is movable at least in the lowering direction of the containers (thus vertically). The receptacle can pick up a container. In contrast to the embodiment of FIG. 3, this picking up takes place such that the container, once it has been picked up by the receptacle, can no longer move freely (under the influence of gravity) relative to the receptacle. This can be achieved, for example, by means of suitable chamber elements which grip the container below its support ring.

In this embodiment, it is provided that the receptacles are movable in a vertical direction relative to the shuttles so that they can lower a container from the first transporting device onto the second transporting device, as can be seen in the schematic side view of FIG. 4. In this embodiment, it is not necessary for the second transporting device to have a downwardly inclined transfer plane 121 in the transfer region, since the lowering is effected by the receptacle and the shuttles. It is particularly preferred, if the lowering of the containers through the receptacles can be controlled by a control unit, such as a computer, such that, regardless of the size of the containers at the end of the transfer area, the container has been lowered onto the second transporting device.

Alternatively, the shuttles can also form pockets in which the containers can in turn be lowered in a guided manner. These pockets are either embedded directly in the shuttles, or the shuttles form a pocket due to the distance between the shuttles, or separators are attached to the shuttles, or two short shuttles are always used to form pockets. The advantage then lies in a flexible pocket size, which can be individually adapted to the respective container diameters.

Instead of a long stator, the receptacles can also revolve along a chain and be permanently mounted on it. However, the use of a long stator allows the individual shuttles to be moved independently so that, for example, it is also possible to react to gaps in the flow of containers from the first transporting device and only set a shuttle in motion when a container is to be transferred from the first transporting device to the second transporting device. For this purpose, when a long stator is used, suitable control of the movement of the individual shuttles can be carried out independently of one another—possibly with the exception of collision monitoring and collision avoidance.

The invention claimed is:

1. A transporting installation for containers, the containers comprising bottles, having a first transporting device, the first transporting device configured to transport containers by neck-handling, and a second transporting device, the second transporting device configured to transport containers by base-handling, wherein the first transporting device transports the containers at a different height from the second transporting device, wherein, in a transfer region in which the containers can be transferred from the first transporting device to the second transporting device, the second transporting device runs linearly and a linear guide device is provided, said guide device running parallel to the second transporting device and being adapted such that the guide device can guide a container as the container is being lowered from the first transporting device to the second transporting device.

2. The transporting installation according to claim 1, wherein the first transporting device and the second transporting device have, at least in the transfer region, a distance perpendicular to a transport plane of the containers that is greater than or equal to a length of a container that can be transported by the first and the second transporting device.

3. The transporting installation according to claim 1, wherein the second transporting device has a transfer plane in the transfer region that is inclined downwardly in the transport direction of the containers.

4. The transporting installation according to claim 3, wherein the transfer plane is height-adjustable or exchangeable.

5. The transporting installation according to claim 3, wherein the guide device comprises at least one guiding screw arranged between the first transporting device and the second transporting device and on one side of the second transporting device in the transfer region for guiding the containers.

6. The transporting installation according to claim 5, wherein the guide device comprises a second guiding screw for guiding the containers, wherein the second guiding screw is arranged on the same side of the second transporting device and at a distance from the second transporting device that is different from the distance of the first guiding screw from the second transporting device, or wherein the second guiding screw is arranged on the opposite side of the second transporting device.

7. The transporting installation according to claim 3, wherein the guide device comprises at least one clamping device arranged between the first transporting device and the second transporting device and movable in the transport direction of the containers, which can guide a container by clamping the container during lowering from the first transporting device to the second transporting device.

8. The transporting installation according to claim 1, wherein the second transporting device has a horizontal transport plane in the transfer region and the guide device comprises at least one receptacle which is movable in the transport direction of the containers in the second transporting device and with which a container can be picked up from the first transporting device and transferred to the second transporting device, wherein the receptacle is adapted to lower the container from the first transporting device onto the second transporting device.

9. The transporting installation according to claim 8, wherein the guide device comprises a long stator and the receptacle is configured as a shuttle which is movable along the long stator and has a pick-up region for a container.

10. The transporting installation according to claim 1, wherein the guide device runs linearly and has no curvature or a curvature of up to approximately 3° or up to approximately 7°.

11. A method for transferring containers, the method comprising transferring containers from a first transporting device to a second transporting device in a transfer region, wherein the first transporting device and the second transporting device transport the containers at different heights from one another, and the first transporting device transports the containers by neck-handling and the second transporting device transports the containers by base-handling, wherein the containers are transported linearly in the second transporting device and a linear guide device is provided which runs parallel to the second transporting device and guides a container during a lowering from the first transporting device to the second transporting device.

12. The method according to claim 11, wherein the first transporting device and the second transporting device have, at least in the transfer region, a distance perpendicular to the transport plane of the containers which is greater than or equal to a length of a container transported by the first and the second transporting device.

13. The method according to claim 12, wherein the second transporting device has a transfer plane in the transfer region which is inclined downwardly in the transport direction of the containers, wherein the transfer plane is adjustable in height and the height of the transfer plane is set depending on the length of the container.

14. The method according to claim 13, wherein the guide device comprises at least one guiding screw arranged between the first transporting device and the second transporting device and on one side of the second transporting device in the transfer region, which guides the container during lowering from the first transporting device onto the second transporting device.

15. The method according to claim 13, wherein the guide device comprises at least one clamping device arranged between the first transporting device and the second transporting device and movable in the transport direction of the containers, which guides a container by clamping the container during lowering from the first transporting device to the second transporting device.

16. The method according to claim 11, wherein the second transporting device has a horizontal transport plane in the transfer region and the guide device comprises at least one receptacle which is movable in the transport direction of the containers in the second transporting device and by means of which a container is picked up from the first transporting device and transferred to the second transporting device, wherein the receptacle lowers the container from the first transporting device onto the second transporting device in the transfer region.

17. The method according to claim 11, wherein the guide device runs linearly and has no curvature or a curvature of up to approximately 3° or up to approximately 7°.

* * * * *